US012612816B2

(12) United States Patent
Hammerer

(10) Patent No.: US 12,612,816 B2
(45) Date of Patent: Apr. 28, 2026

(54) GUIDE SYSTEM FOR GUIDING AT LEAST ONE DOOR LEAF RELATIVE TO A FURNITURE BODY

(71) Applicant: Julius Blum GmbH, Hoechst (AT)

(72) Inventor: André Hammerer, Alberschwende (AT)

(73) Assignee: JULIUS BLUM GMBH, Hoechst (AT)

( * ) Notice: Subject to any disclaimer, the term of this patent is extended or adjusted under 35 U.S.C. 154(b) by 92 days.

(21) Appl. No.: 18/208,986

(22) Filed: Jun. 13, 2023

(65) Prior Publication Data

US 2023/0323721 A1 Oct. 12, 2023

Related U.S. Application Data

(63) Continuation of application No. PCT/AT2021/060477, filed on Dec. 14, 2021.

(30) Foreign Application Priority Data

Dec. 17, 2020 (AT) .............................. A 51107/2020

(51) Int. Cl.
*E05F 1/12* (2006.01)
*E05D 15/58* (2006.01)

(52) U.S. Cl.
CPC .......... *E05F 1/1253* (2013.01); *E05D 15/581* (2013.01); *E05D 2015/586* (2013.01);
(Continued)

(58) Field of Classification Search
CPC ................. E05F 1/1253; E05D 15/581; E05D 2015/586; E05D 15/264; E05D 15/58;
(Continued)

(56) References Cited

U.S. PATENT DOCUMENTS 3,952,368 A * 4/1976 Zernig ...................... E05D 3/06 16/294
4,827,569 A * 5/1989 Mertes ...................... E05D 3/18 16/302
(Continued)

FOREIGN PATENT DOCUMENTS

AT 519374 6/2018
AT 521260 12/2019
(Continued)

OTHER PUBLICATIONS

WO2018129574 translation (Year: 2018).*
(Continued)

*Primary Examiner* — Hiwot E Tefera
(74) *Attorney, Agent, or Firm* — Wenderoth, Lind & Ponack, L.L.P.

(57) ABSTRACT

A guide system for guiding a door wing relative to a furniture carcass, the guide system including a guide configured to guide the door wing along a sidewall of the furniture carcass, and a carrier movably supported along the guide, the door wing being supportable on the carrier over a pivoting path between a first position and a second position. A drive device is arranged on the carrier or on a mounting member to be fixed to the carrier, and the door wing connected to the carrier in a mounted condition can be driven at least in a partial section of the pivoting path into the first position and/or into the second position by the drive device.

25 Claims, 7 Drawing Sheets

(52) U.S. Cl.
CPC ..... *E05Y 2600/456* (2013.01); *E05Y 2600/50* (2013.01); *E05Y 2900/212* (2013.01)

(58) Field of Classification Search
CPC ............ E05D 7/0415; E05D 2003/166; E05Y 2600/456; E05Y 2600/50; E05Y 2900/212; E05Y 2900/20
See application file for complete search history.

(56) References Cited

U.S. PATENT DOCUMENTS

| | | | | |
|---|---|---|---|---|
| 5,131,449 | A * | 7/1992 | Winn | E06B 3/5045 160/214 |
| 6,374,459 | B1 * | 4/2002 | Zetti | E05D 3/16 16/370 |
| 7,814,621 | B1 * | 10/2010 | Radke | E05D 11/1014 16/388 |
| 11,168,502 | B2 | 11/2021 | Oshima et al. | |
| 11,274,482 | B2 | 3/2022 | Rupp et al. | |
| 11,629,540 | B2 | 4/2023 | Blum et al. | |
| 11,952,816 | B2 | 4/2024 | Hoffmann | |
| 2014/0150208 | A1 * | 6/2014 | Haab | E05D 7/00 16/86.2 |
| 2017/0241175 | A1 * | 8/2017 | Hammerer | E05D 3/16 |
| 2019/0284859 | A1 | 9/2019 | Rupp et al. | |
| 2019/0301216 | A1 * | 10/2019 | Rupp | E05D 15/26 |
| 2019/0301218 | A1 * | 10/2019 | Rupp | E05D 15/58 |
| 2019/0330898 | A1 * | 10/2019 | Rupp | E05D 15/58 |
| 2020/0048947 | A1 * | 2/2020 | Blum | E05D 15/264 |
| 2020/0063482 | A1 * | 2/2020 | Kohlweiss | E05F 1/10 |
| 2021/0172229 | A1 | 6/2021 | Oshima et al. | |
| 2021/0246700 | A1 | 8/2021 | Hoffmann | |
| 2021/0262258 | A1 * | 8/2021 | Duer | E05D 3/16 |
| 2021/0262260 | A1 * | 8/2021 | Duer | E05D 11/0054 |
| 2021/0310293 | A1 * | 10/2021 | Blum | E05D 15/58 |
| 2022/0056744 | A1 * | 2/2022 | Duer | E05D 15/262 |
| 2022/0074250 | A1 * | 3/2022 | Duer | E05D 15/264 |
| 2022/0372808 | A1 * | 11/2022 | Fink | E05D 15/264 |

FOREIGN PATENT DOCUMENTS

| | | | |
|---|---|---|---|
| CN | 110199080 | 9/2019 | |
| EP | 3 751 084 | 12/2020 | |
| ES | 2 034 809 | 4/1993 | |
| JP | 56-159581 | 11/1981 | |
| JP | 1-122168 | 8/1989 | |
| JP | 2-3109 | 1/1990 | |
| JP | 2-91872 | 7/1990 | |
| JP | 6-146702 | 5/1994 | |
| JP | 10-339066 | 12/1998 | |
| JP | 2020-514591 | 5/2020 | |
| JP | 2022-514898 | 2/2022 | |
| TW | 201831770 | 9/2018 | |
| WO | 2018/129572 | 7/2018 | |
| WO | WO-2018129574 A1 * | 7/2018 | E05D 15/264 |
| WO | 2018/216564 | 11/2018 | |
| WO | 2020/097644 | 5/2020 | |
| WO | 2020/124108 | 6/2020 | |

OTHER PUBLICATIONS

International Search Report issued Mar. 17, 2022 in International (PCT) Application No. PCT/AT2021/060477.

Chinese Search Report issued Jul. 21, 2025 in corresponding Chinese Patent Application No. 202180084491.0.

* cited by examiner

GUIDE SYSTEM FOR GUIDING AT LEAST ONE DOOR LEAF RELATIVE TO A FURNITURE BODY

BACKGROUND OF THE INVENTION

The present invention relates to a guide system for guiding at least one door wing relative to a furniture carcass. The guide system comprises:

- at least one guide configured to guide the at least one door wing along a sidewall of the furniture carcass, and
- at least one carrier movably supported along the at least one guide, the at least one door wing being supportable on the at least one carrier over a pivoting path between a first position and a second position.

Moreover, the invention concerns an arrangement comprising a guide system of the type to be described and at least one furniture hinge arranged on the carrier, the at least one furniture hinge being separate from the drive device.

Finally, the invention relates to an item of furniture comprising a furniture carcass, at least one door wing movable relative to the furniture carcass, and at least one guide system of the type to be described.

A generic guide system for guiding a movable door wing is disclosed in the WO 2020/097644 A1 for example. The door wing is pivotally supported via two or more furniture hinges on a longitudinal carrier extending vertically in a mounted position. For inserting the door wing into a lateral insertion compartment of the furniture carcass, the carrier is movable along a guide which is fixed to the sidewall of the furniture carcass. The door wing is movable between a first position, in which the door wing is aligned substantially at a right angle to the sidewall of the furniture carcass, and a second position, in which the door wing is aligned substantially parallel to the sidewall of the furniture carcass.

A drawback with the prior art is the fact that the door wing can adopt an undefined intermediate position relative to the carrier, and the door wing can collide with the sidewall or the furniture carcass cannot be fully closed by the door wing.

SUMMARY OF THE INVENTION

It is an object of the present invention to provide a guide system mentioned in the introductory part, thereby avoiding the above-mentioned drawbacks.

According to the invention, at least one drive device is arranged on the carrier or on a mounting member to be fixed to the carrier, and the at least one door wing connected to the carrier in a mounted condition can be driven at least in a partial section of the pivoting path into the first position and/or into the second position by the at least one drive device.

Accordingly, the at least one door wing can be moved into a defined end position relative to the carrier, without the door wing remaining in an undesired intermediate position.

Usually, the door wing is connected to the carrier via two or more furniture hinges. The furniture hinges, alone due to the considerable weight of the door wing, must be sturdily constructed. The production of these furniture hinges for supporting the door wing is thus cost-intensive. For reducing the costs, not each of these furniture hinges have to be equipped with an own force storage member for moving the door wing.

Instead, at least one furniture hinge, preferably all furniture hinges provided for moving the door wing, can be equipped without an own force storage member for driving the door wing. As a result, the at least one door wing can thus be driven relative to the carrier exclusively by the drive device.

In other words, the kinematics of the door wing is predetermined by the provided furniture hinges which do not have an own force storage member for driving the door wing. Instead, in order to drive the door wing relative to the carrier, the drive device, preferably exclusively, takes over the driving function for the door wing. Preferably, the drive device can be the only drive device for driving the door wing relative to the carrier.

Because of the fact that the drive device can form the only device for driving the door wing relative to the carrier, the drive device can be robustly built and can be equipped with a powerful force storage member.

Equipping the furniture hinges without an own force storage member further provides the possibility that the door wing is also suitable for Touch-Latch applications.

By a Touch-Latch device, the door wing can be moved from its closed position into an open position by overpressing. If the furniture hinges were equipped with an own force storage member, the hindering retaining force of the furniture hinges would have to be overcome by the Touch-Latch device. In such a case, the Touch-Latch device, depending on the number of the used furniture hinges, would have to be unnecessarily equipped with very powerful, expensive and occasionally dangerously-operating force storage member.

Instead, the furniture hinges provided for moving the door wing, preferably an entirety of the furniture hinges provided for moving the door wing, can be equipped without an own force storage member for moving the door wing. In this way, the door wing can be ejected by a Touch-Latch device having a relatively weak force accumulator. The customer or the assembling person on the spot can optionally decide whether an additional drive device for driving the door wing shall be provided or not.

BRIEF DESCRIPTION OF THE DRAWINGS

Further details and advantages of the present invention will be explained with the aid of the following description and drawings, in which.

DETAILED DESCRIPTION OF THE INVENTION

Figure 1A:
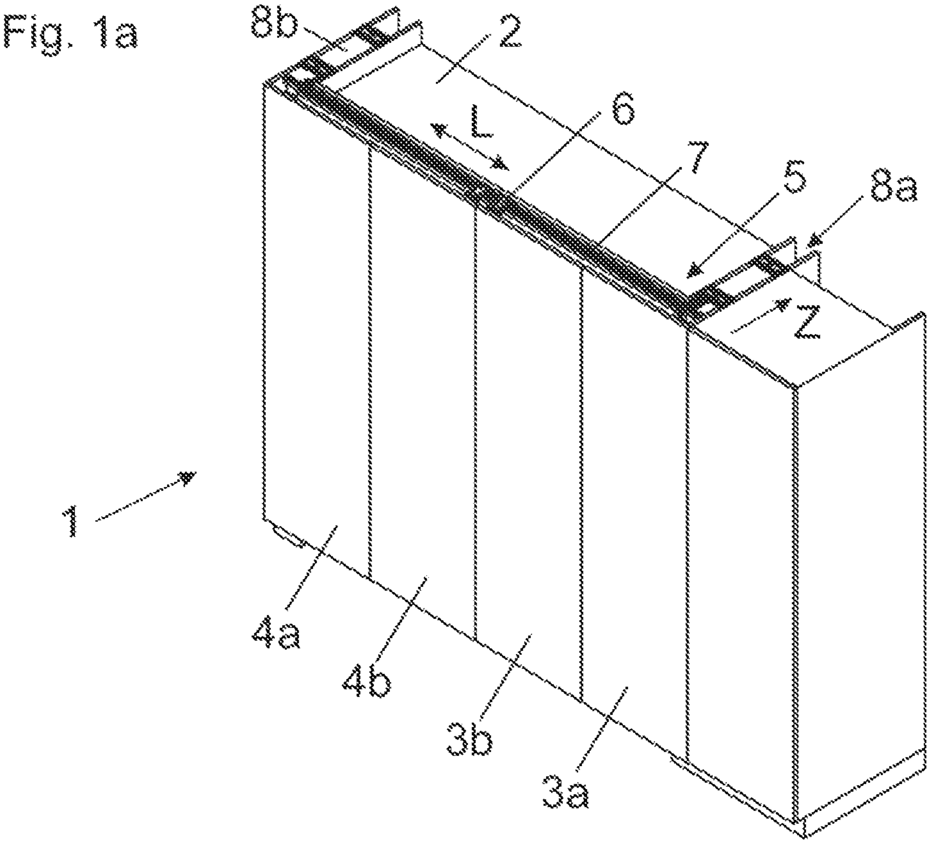
FIG. 1*a*, 1*b* show a perspective view of an item of furniture comprising a furniture carcass and door wings movable thereto.

FIG. 1*a* shows a perspective view of an item of furniture 1 comprising a furniture carcass 2 and door wings 3*a*, 3*b*; 4*a*,

4*b* movable relative thereto. The door wings 3*a*, 3*b* and the door wings 4*a*, 4*b* are each movable by a guide system 5 between a first position, in which the door wings 3*a*, 3*b*; 4*a*, 4*b* are aligned substantially coplanar to one another, and a second position, in which the door wings 3*a*, 3*b*; 4*a*, 4*b* are aligned substantially parallel to one another.

The door wings 3*a*, 3*b*, in a second (parallel) position, can be inserted into a lateral receiving compartment 8*a* of the furniture carcass 2, whereas the door wings 4*a*, 4*b*, in a parallel position to one another, can be inserted into a further receiving compartment 8*b*.

The functionality will be explained in the following with the aid of the door wings 3*a* and 3*b*, and the same explanations apply to the door wings 4*a*, 4*b*.

The guide system 5 includes a guide rail 7 having a longitudinal direction (L), and a guide carriage 6 configured to be connected to the second door wing 3*b* is displaceably supported along the guide rail 7. The guide rail 7, in a mounted condition, extends substantially parallel to the front face of the furniture carcass 2.

Figure 1B:
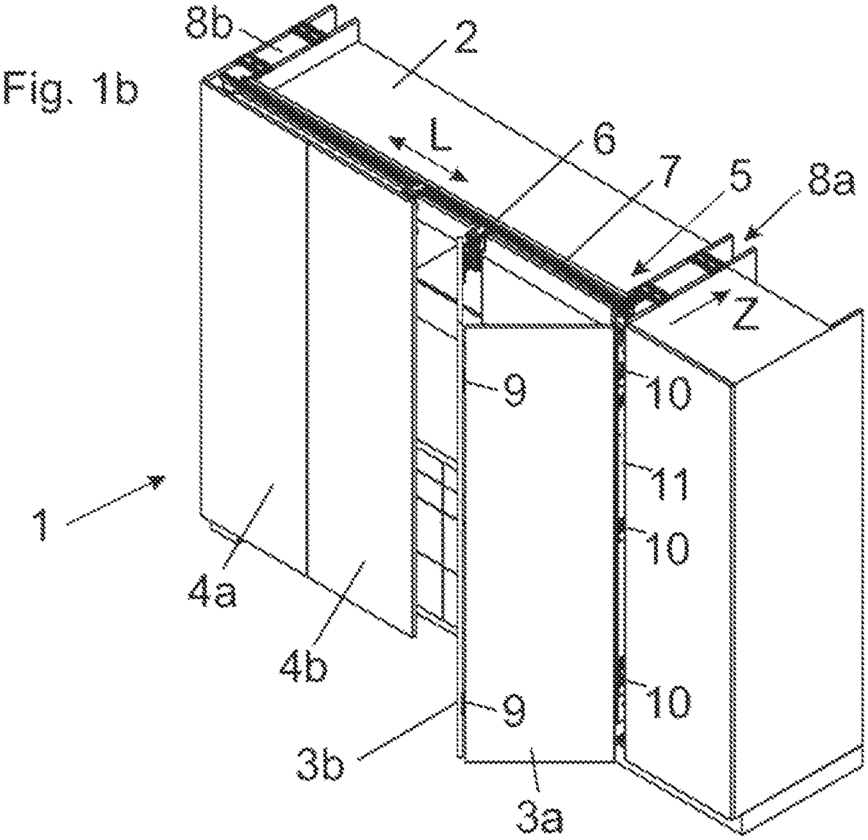

FIG. 1*b* shows the item of furniture 1, in which the door wings 3*a*, 3*b* have been moved from the coplanar position shown in FIG. 1*a* into an angled position to one another. The first door wing 3*a* is pivotally supported on a carrier 11 via two or more furniture hinges 10. The carrier 11 (jointly with the door wings 3*a*, 3*b*) can be inserted in a depth direction (Z) into the lateral receiving compartment 8*a*.

In FIG. 1*b*, the carrier 11 is located in a transfer position in which the carrier 11 adjoins the guide rail 7 in the longitudinal direction (L) so as to transfer the guide carriage 6 to and from between the guide rail 7 and the carrier 11. In the shown transfer position, the carrier 11 is releasably locked to the guide rail 7, and the locking between the guide rail 7 and the carrier 11 is releasable by an entry of the guide carriage 6 in or onto the carrier 11.

The carrier 11 is in the form of a longitudinally extending column, and a length of which corresponds to at least half of a height of the door wings 3*a*, 3*b*. The two door wings 3*a*, 3*b* are hingedly connected to one another via a vertically extending axis by at least one hinge fitting 9. The second door wing 3*b* is displaceably supported along the guide rail 7 via the guide carriage 6.

Figure 2A:
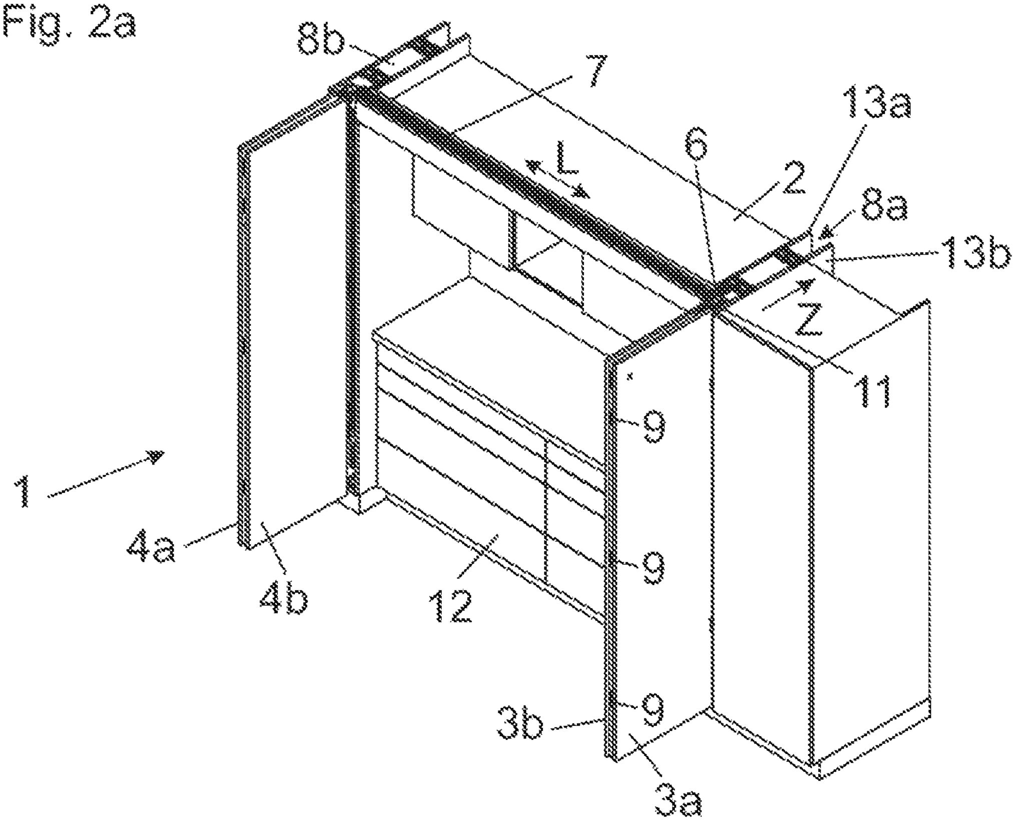
FIG. 2*a*, 2*b* show the item of furniture according to FIGS. 1*a*, 1*b* in further positions of the door wings relative to each other.

FIG. 2*a* shows the item of furniture 1 with the door wings 3*a* and 3*b* which are now aligned parallel to one another. The carrier 11 has been unlocked from the guide rail 7 by an entry of the guide carriage 6, and the carrier 11 (jointly with the guide carriage 6 and the door wings 3*a*, 3*b*) can be inserted in the depth direction (Z) of the furniture carcass 2 into the receiving compartment 8*a*. The depth direction (Z) extends transversely, preferably substantially at a right angle, to the longitudinal direction (L) of the guide rail 7.

Figure 2B:
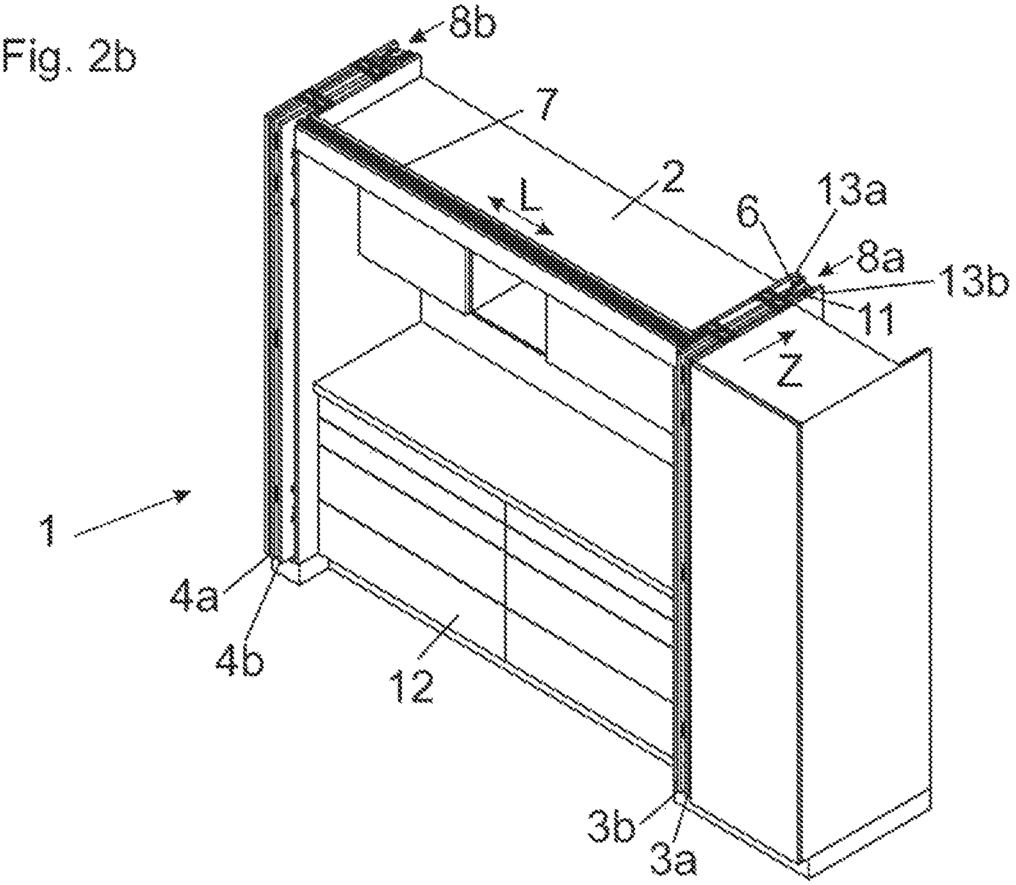

FIG. 2*b* shows the item of furniture 1 with the door wings 3*a*, 3*b* which are now located in a fully inserted condition within the receiving compartment 8*a*. The door wings 3*a*, 3*b* are thus movable by the guide system 5 between a first position according to FIGS. 1*a*, 1*b*, in which the door wings 3*a*, 3*b* are aligned substantially coplanar to one another, and a second position according to FIG. 2*b*, in which the door wings 3*a*, 3*b* are aligned substantially parallel to one another and being received within the receiving compartment 8*a*.

In this way, for example, a kitchen 12 as shown in FIG. 2*a*, 2*b* can be entirely covered so as to visually separate the kitchen 12 from a remaining area of a living room.

In the shown embodiment, the receiving compartment 8*a* is formed by a sidewall 13*a* and a separating wall 13*b* mutually spaced from the sidewall 13*a* in a parallel relationship. The door wings 3*a*, 3*b*, in a parallel position to one another, can be inserted between the sidewall 13*a* and the separating wall 13*b*.

Figure 3A:
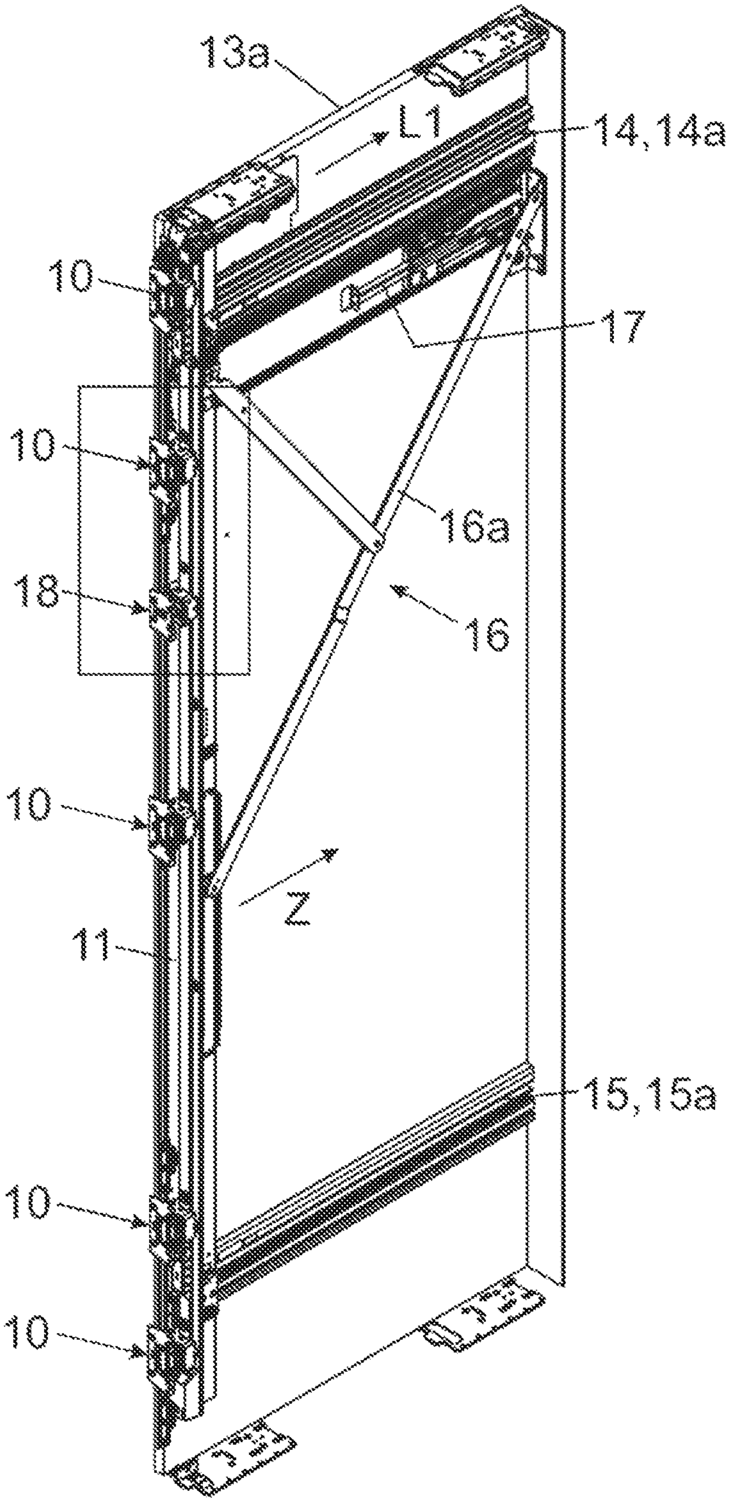
FIG. 3*a*, 3*b* are a perspective view and an enlarged view of the guide fixed to the sidewall, the guide being configured for displaceably supporting the carrier.

FIG. 3*a* shows the sidewall 13*a* of the furniture carcass 2 and the guides 14, 15, preferably in the form of guide rails 14*a*, 15*a*, fixed to the sidewall 13*a* for displaceably supporting the carrier 11 in the depth direction (Z) of the furniture carcass 2. The two guides 14, 15 are fixed to the sidewall 13*a* and are mutually spaced apart from each other in a height direction. However, it can be basically sufficient to provide only one guide 14, 15 for supporting the carrier 11.

The at least one guide 14, 15 has a longitudinal direction (L1) extending transversely, preferably at a right angle, to the longitudinal direction (L) of the guide rail 7. The longitudinal carrier 11 for supporting the furniture hinges 10 is displaceable between a retracted end position and an extended end position along the at least one guide 14, 15, for example via at least one running wheel (not shown here). In the shown embodiment, two or more (in the present case five) furniture hinges 10 for pivotally supporting the door wing 3*a* are arranged on the carrier 11.

The guide system 5 can include at least one compensation device 16 for compensating for a tilting moment of the carrier 11 about a tilting axis by a return moment. The compensation device 16 can include, for example, a scissors mechanism 16*a* and/or a cable pulley device (not shown).

According to an embodiment, it can be provided that the carrier 11 can be ejected from the retracted end position in a direction of the extended end position by a, preferably releasably lockable, ejection device 17.

At least one drive device 18 separate from the furniture hinges 10 is arranged on the carrier 11, and the door wing 3*a* connected to the carrier 11 in a mounted condition is configured to be driven by the drive device 18 between a first position and a second position relative to the carrier 11. In this way, undefined intermediate positions of the door wing 3*a* relative to the carrier 11 can be prevented.

Preferably, the drive device 18 is connected to the carrier 11 and to the door wing 3*a* in all operating positions of the door wing 3*a*. Alternatively, the drive device 18 can be configured such that the drive device 18 can be releasably coupled to the at least one door wing 3*a*.

For driving the carrier 11 along the at least one guide 14, 15, at least one drive device (not shown) separate from the drive device 18 can be provided. Therefore, the carrier 11 (and therewith the at least one door wing 3*a*) can be driven by the separate drive device at least over a region between the retracted end position and the extended end position. Preferably, the drive devices provided for driving the carrier 11 operate exclusively mechanically, that is to say without an electric drive and without further electrical components.

Figure 3B:
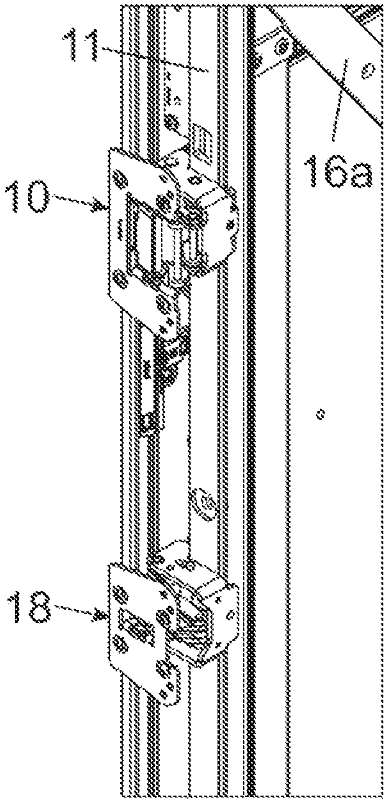

FIG. 3*b* shows the framed region of FIG. 3*a* in an enlarged view.

Figure 4A:
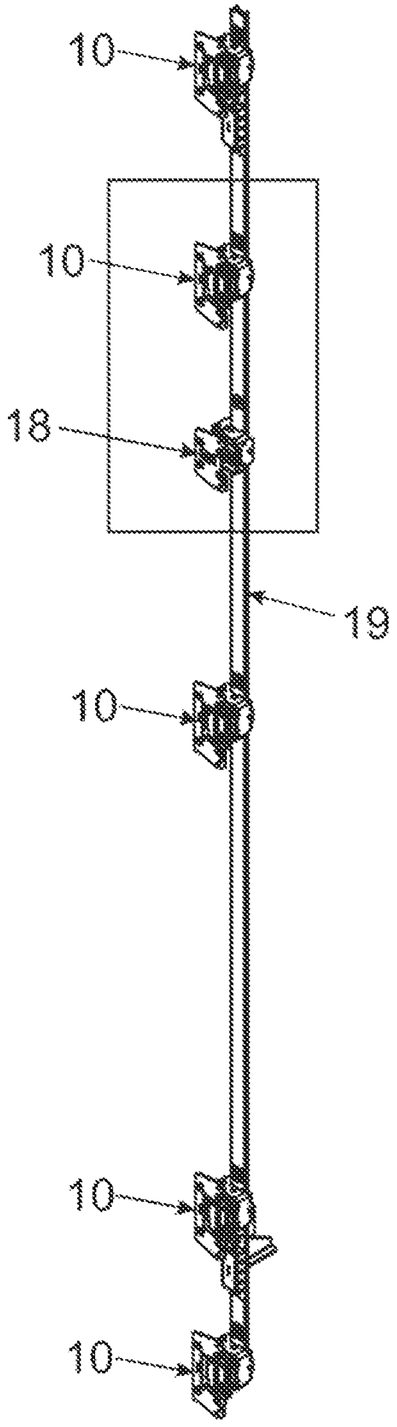
FIG. 4*a*, 4*b* are a perspective view and an enlarged view of the mounting member to be fixed to the carrier, the mounting member being configured to support the furniture hinges and the drive device.

FIG. 4*a* shows the mounting member 19 for supporting the furniture hinges 10 and for supporting the drive device 18. For example, the mounting member 19 can be in the form of a longitudinally extending profile rail configured to be releasably connected to the carrier 11.

In a first mounting step, the furniture hinges 10 and the drive device 18 are pre-mounted to the mounting member 19. In a subsequent mounting step, the mounting member 19 (jointly with the pre-mounted components) is connected to the carrier 11. Preferably, the mounting member 19 is configured to be connected to the carrier 11 in a direction extending transversely to the longitudinal direction of the carrier 11.

Figure 4B:
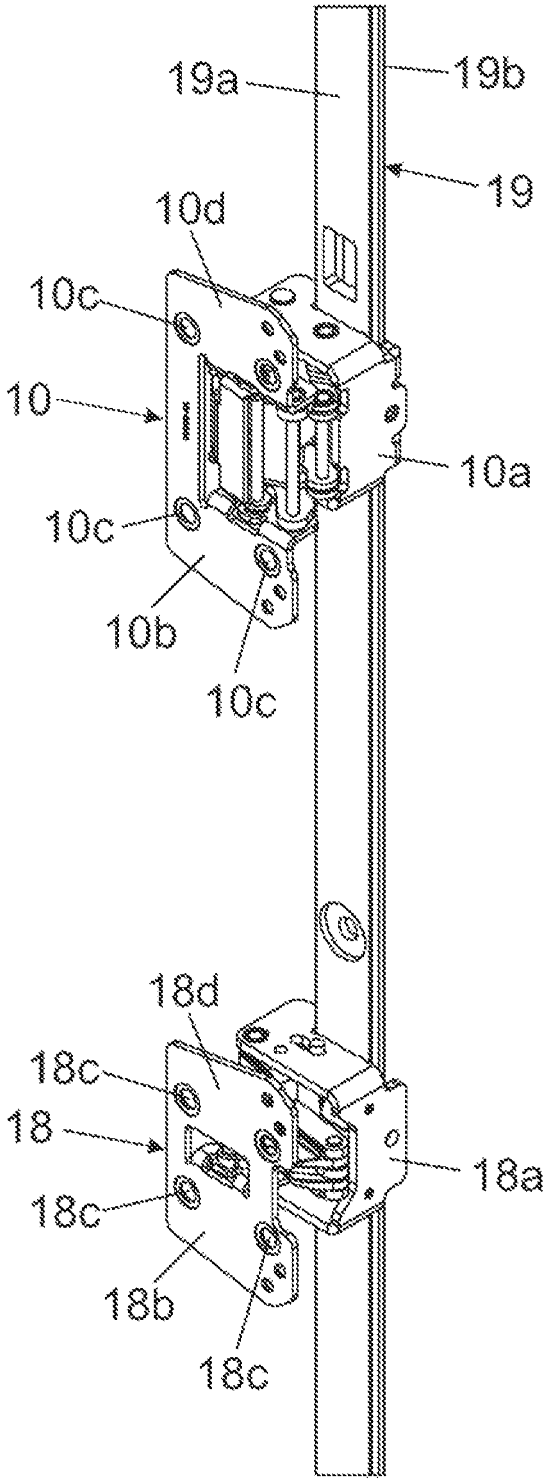

FIG. 4*b* shows the framed region of FIG. 4*a* in an enlarged view. The mounting member 19 can be configured as a lengthy profile rail having a substantially U-shaped or L-shaped cross-section. The mounting member 19 can include a first limb 19*a* configured to bear against the carrier 11 and at least one second limb 19*b*, the second limb 19*b* protruding transversely, preferably substantially at a right angle, from the first limb 19*a*.

At least one furniture hinge 10 for movably supporting the door wing 3*a* and at least one drive device 18 for driving the door wing 3*a* are arranged on the mounting member 19.

The furniture hinge 10 includes a first fitting body 10*a* configured to be fixed to the mounting member 19, and a second fitting body 10*b* configured to be fixed to the door wing 3*a*. The first fitting body 10*a* and the second fitting body 10*b* are hingedly connected to each other. At least one fastening location 10*c* for fixing the door wing 3*a* is provided on the second fitting body 10*b* of the furniture hinge 10. The at least one fastening location 10*c* can be configured, for example, as a hole, as a dowel or as a locking element.

The second fitting body 10*b* of the furniture hinge 10 includes a flat-shaped bearing surface 10*d* configured to bear against the door wing 3*a*. The first fitting body 10*a* and the second fitting body 10*b* are movable relative to one another between a first position and a second position. In the first position, the bearing surface 10*d* of the second fitting body 10*b* is aligned substantially parallel to the first limb 19*a* of the mounting member 19 (that is to say approximately perpendicular to the sidewall 13*a* of the furniture carcass 2). In the second position, the bearing surface 10*d* of the second fitting body 10*b* is aligned substantially at a right angle to the first limb 19*a* of the mounting member 19 (that is to say approximately parallel to the sidewall 13*a* of the furniture carcass 2).

The drive device 18 separate from the furniture hinge 10 for driving the door wing 3*a* relative to the carrier 11 includes a first fitting portion 18*a* configured to be fixed to the carrier 11 or configured to be fixed to the mounting member 19, and a second fitting portion 18*b* is configured to be fixed to the door wing 3*a*. The first fitting portion 18*a* and the second fitting portion 18*b* of the drive device 18 are hingedly connected to one another. At least one fastening location 18*c* for fixing the door wing 3*a* is provided on the second fitting portion 18*a* of the drive device 18. For example, the at least one fastening location 18*c* can be configured as a hole, as a dowel or as a locking element.

The second fitting portion 18*b* of the drive device 18 includes a flat bearing surface 18*d* configured to bear against the door wing 3*a*. The first fitting portion 18*a* and the second fitting portion 18*b* of the drive device 18 are movable relative to each other between a first position and a second position. In the first position, the bearing surface 18*d* of the second fitting portion 18*b* is aligned substantially parallel to the first limb 19*a* of the mounting member 19 (that is to say approximately perpendicular to the sidewall 13*a* of the furniture carcass 2). In the second position, the bearing surface 18*d* of the second fitting portion 18*b* is aligned substantially at a right angle to the first limb 19*a* of the mounting member 19 (that is to say approximately parallel to the sidewall 13*a* of the furniture carcass 2).

Figure 5A:
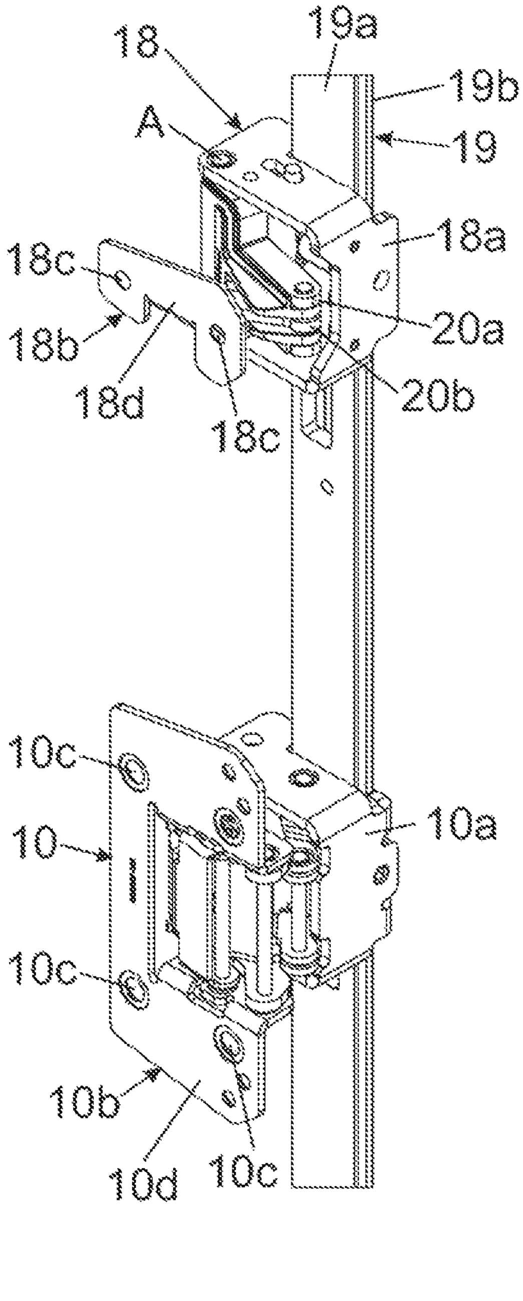
FIG. 5*a*, 5*b* show a drive device arranged on the mounting member and a furniture hinge arranged on the mounting member in two different relative positions.

FIG. 5*a* shows a drive device 18 arranged on the mounting member 19 and a furniture hinge 19 arranged on the mounting member 19. In the shown figure, the bearing surface 18*d* of the second fitting portion 18*b* is aligned such that the door wing 3*a* connected to the second fitting portion 18*b* in a mounted condition is aligned substantially at a right angle to the sidewall 13*a* of the furniture carcass 2. This position of the bearing surface 18*d* corresponds to the coplanar position of the furniture parts 3*a*, 3*a* to one another (FIG. 1*a*).

Figure 5B:
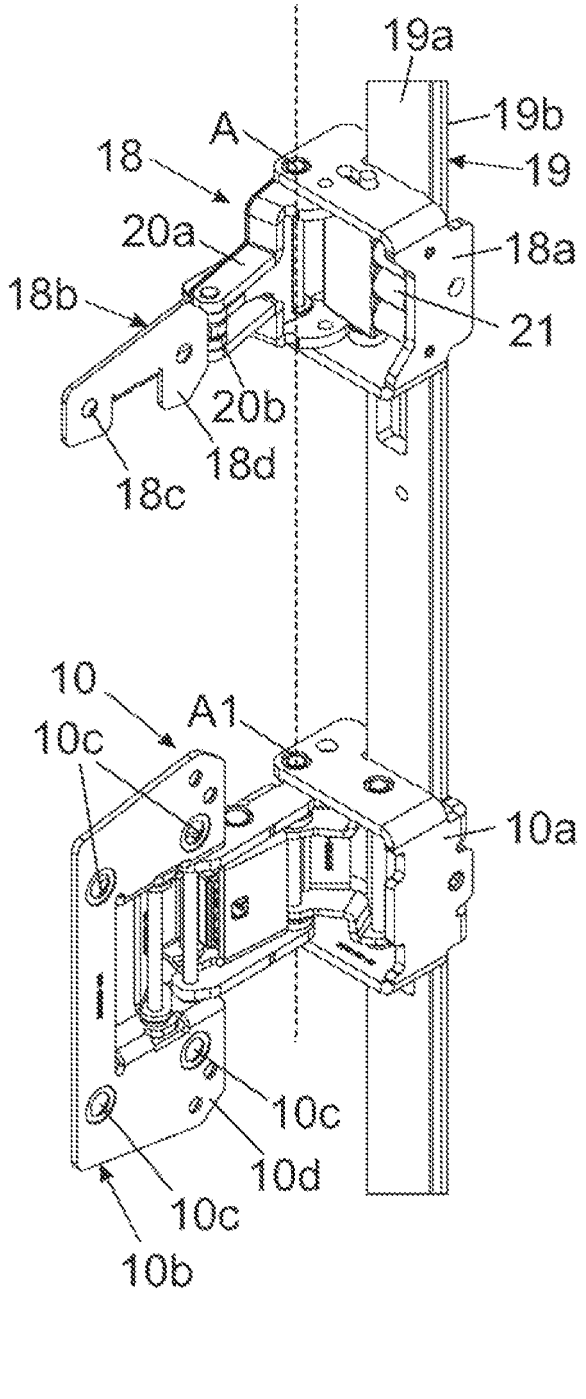

FIG. 5*b* shows the arrangement according to FIG. 5*a* in a further relative position of the drive device 18 and of the furniture hinge 10. The bearing surface 18*d* of the second fitting portion 18*b* of the drive device 18 is positioned such that the door wing 3*a* connected to the second fitting portion 18*b* in a mounted condition is aligned substantially parallel to the sidewall 13*a* of the furniture carcass 2. This position of the bearing surface 18*d* thus corresponds to the parallel position of the furniture parts 3*a*, 3*a* to one another (FIG. 2*a*).

In the shown embodiment, it is provided that the first fitting portion 18*a* and the second fitting portion 18*b* of the drive device 18 are pivotally connected to one another via at least two levers 20*a*, 20*b* hingedly connected to one another.

The drive device 18 can include at least one force storage member 21 configured to drive the first fitting portion 18*a* and the second fitting portion 18*b* relative to one another into the first position and/or into the second position. For example, the force storage member 21 can include at least one helical spring, preferably at least one compression spring.

The drive device 18 includes at least one first hinge axis (A), whereas the furniture hinge 10 includes at least one second hinge axis (A1). The first hinge axis (A) of the drive device 18 and the second hinge axis (A1) of the furniture hinge 10 extend coaxial to one another in a mounted condition on the carrier 11, and each of the first hinge axis (A) and the second hinge axis (A1) extends in a vertical direction.

Preferably, the at least one door wing 3*a* is configured to be driven exclusively by the drive device 18, and that the at least one furniture hinge 10 itself does not have an own force storage member for driving the at least one door wing 3*a*.

Figure 6A:
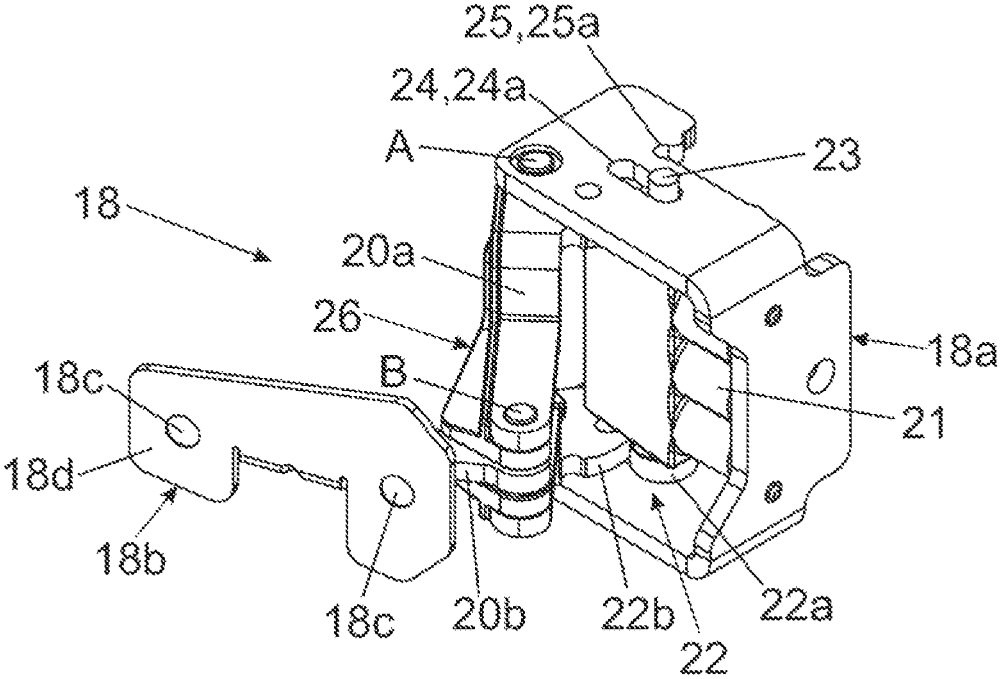
FIG. 6*a*, 6*b* show the drive device in two different perspective views.
Figure 6B:
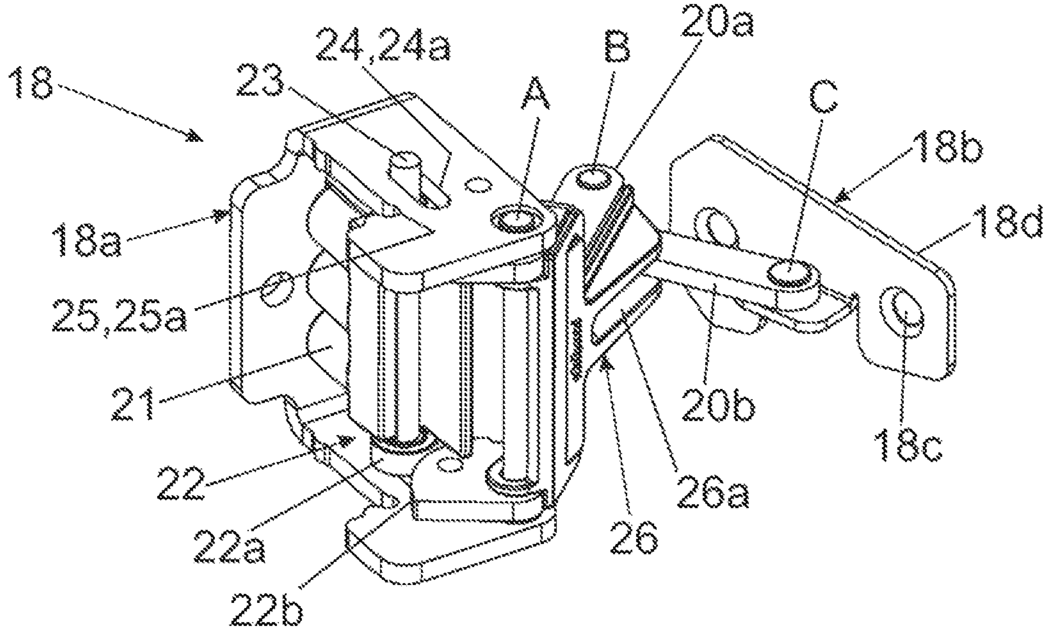

FIG. 6*a* and FIG. 6*b* each show the drive device 18 in two different perspective views. The drive device 18 includes a transmission mechanism 22 for transmitting a force of the force storage member 21 to the second fitting portion 18*b*.

For example, the transmission mechanism 22 can include at least one pressure portion 22*a* and at least one setting contour 22*b*, and the at least one pressure portion 22*b* can be displaceably supported on the setting contour 22*b* upon a relative movement of the fitting portions 18*a*, 18*b* to one another.

With possible embodiments, it can be provided that the pressure portion 22*a*

- is movable along at least one guide 24, preferably an elongated hole 24*a*, and/or
- is configured to be rotationally symmetrical, and/or
- is configured as a rotatable roller, and/or
- is arranged on a longitudinally extending pin 23.

In the shown embodiment, the rotatably supported pressure portion 22*a* is pressed against the setting contour 22*b* of the lever 20*a* by force of the force storage member 21, preferably in the form of a plurality of compression springs. Due to the convex shape of the setting contour 22*b*, the fitting portions 18*a*, 18*b* can be driven relative to one another between a first position, in which the door wing 3*a* is aligned substantially parallel to the sidewall 13*a* of the furniture carcass 2, and a second position, in which the door wing 3*a* is aligned substantially perpendicular to the sidewall 13*a* of the furniture carcass 2.

The pressure portion 22*a* is rotationally supported on the longitudinally extending pin 23, and the pin 23 is movable along the guide 24, preferably in the form of the elongated hole 24*a*, upon a relative movement of the fitting portions 18*a*, 18*b* to one another. In the shown figure, the guide 24 is formed or arranged on the first fitting portion 18*a*.

In the shown figure, the first fitting portion 18*a* and the second fitting portion 18*b* of the drive device 18 are pivotally connected to one another via at least two levers 20*a*, 20*b* and at least three hinge axes (A, B, C).

The drive device 18 can include at least one cover 26 configured to at least partially cover a shearing gap formed between the levers 20*a*, 20*b*. By the cover 26, a painful engagement of fingers into a shearing gap formed by the levers 20*a*, 20*b* can be prevented. The cover 26 can include at least one recess 26*a* configured to at least partially receive the lever 20*b*.

Figure 7:
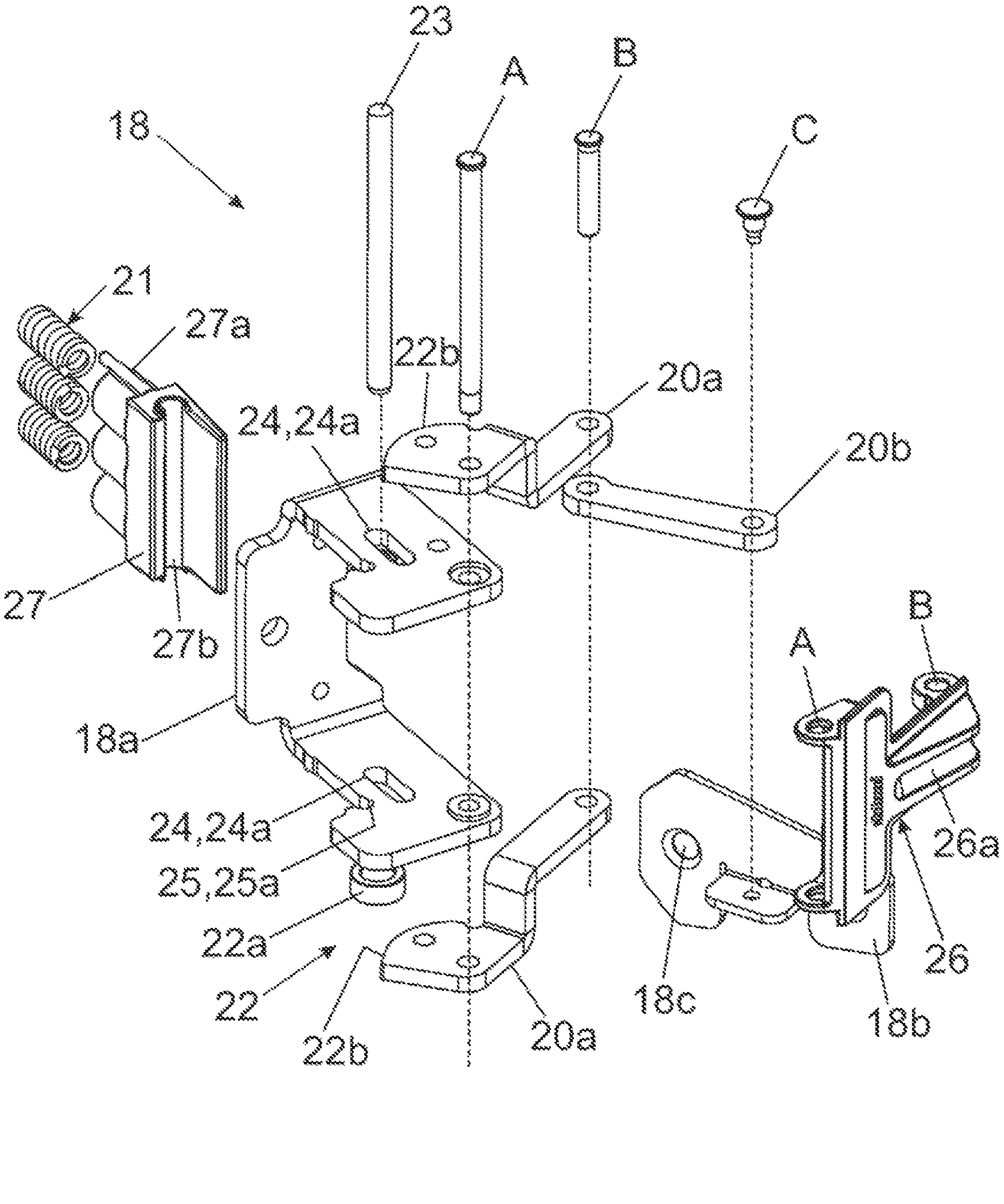
FIG. 7 shows the drive device in an exploded view.

FIG. 7 shows the drive device 18 in an exploded view. A bearing portion 27 includes a first receiving device 27*a* for partially receiving the force storage member 21 and a second receiving device 27*b* for partially receiving the pin 23.

The first fitting portion 18*a* of the drive device 18 can include at least one fastening location 25, preferably having at least one linear guide 25*a*, for fixing to the carrier 11 or for fixing to the mounting member 19. The second fitting portion 18*b* of the drive device 18 can include at least one fastening location 18*c*, preferably having at least one hole, for fixing to the at least one door wing 3*a*.

The first fitting portion 18*a* and the second fitting portion 18*b* of the drive device 18 are pivotally connected to one another by at least one hinge axis (A, B, C). At least one of the fitting portions 18*a*, 18*b* includes at least two partial members mutually spaced apart from each other along the at least one hinge axis (A, B, C).

Preferably, at least one lever 20*a*, 20*b* connecting the fitting portions 18*a*, 18*b* to one another can be at least partially received between the two partial members of the fitting portion 18*a*, 18*b* in at least one relative position.

In the shown embodiment, the lever 20*a* has an angled configuration, and the setting contour 22*b* and the lever 20*a* are formed together so as to have an integral one-piece configuration.

The cover 26 is supportable on the hinge axes (A, B) and can include at least one recess 26*a* for partially receiving at least one lever 20*a*, 20*b*.

The invention claimed is:

1. A guide system for guiding at least one door wing relative to a furniture carcass, the guide system comprising:

a first guide configured to guide the at least one door wing along a sidewall of the furniture carcass; and a carrier movably supported along the first guide, the at least one door wing being supportable on the carrier over a pivoting path between a first position and a second position, wherein a drive device is arranged on the carrier or on a mounting member fixed to the carrier, and the at least one door wing is configured to be connected to the carrier in a mounted condition so as to be driven at least in a partial section of the pivoting path into the first position or into the second position by the drive device, wherein the drive device includes a first fitting portion fixed to the carrier or to the mounting member, and a second fitting portion configured to be fixed to the at least one door wing, wherein the first fitting portion and the second fitting portion are pivotally connected to each other, wherein the drive device includes a force storage member configured to drive the first fitting portion and the second fitting portion of the drive device relative to one another into the first position or into the second position, and wherein the force storage member is arranged directly on the first fitting portion.

2. The guide system according to claim 1, wherein the first fitting portion of the drive device includes at least one fastening location for fixing to the carrier or for fixing to the mounting member, the at least one fastening location having a linear guide configured to displaceably support the drive device along the carrier or along the mounting member.

3. The guide system according to claim 2, wherein the drive device includes a transmission mechanism for transmitting a force of the force storage member to the second fitting portion.

4. The guide system according to claim 2, wherein the first fitting portion and the second fitting portion of the drive device are pivotally connected to one another via at least two levers, the at least two levers being hingedly connected to one another.

5. The guide system according to claim 4, wherein the drive device includes a cover configured to at least partially cover at least one shearing gap formed between the at least two levers.

6. The guide system according to claim 2, wherein the second fitting portion of the drive device includes at least one fastening location for fixing to the at least one door wing.

7. The guide system according to claim 2, wherein the first fitting portion and the second fitting portion of the drive device are pivotally connected to one another via at least one hinge axis, and wherein at least one of the first and second fitting portions includes at least two partial members mutually spaced part from each other along the at least one hinge axis.

8. The guide system according to claim 7, wherein the at least one hinge axis of the drive device extends substantially vertically in a mounted condition on the carrier.

9. The guide system according to claim 2, further comprising at least one furniture hinge, separate from the drive device, for moving the at least one door wing, wherein the drive device and the at least one furniture hinge are arranged on the mounting member, and wherein the mounting member is releasably connected to the carrier.

10. The guide system according to claim 2, wherein the mounting member is configured as a longitudinally extending profile rail.

11. An arrangement comprising:

the guide system according to claim 2; and at least one furniture hinge, the at least one furniture hinge being arranged on the carrier and being separate from the drive device, wherein the drive device includes a first hinge axis and the at least one furniture hinge includes a second hinge axis, and wherein the first hinge axis of the drive device and the second hinge axis of the at least one furniture hinge extend coaxially in a mounted condition on the carrier.

12. An item of furniture comprising:

a furniture carcass;

at least one door wing movable relative to the furniture carcass; and the guide system according to claim 2 for moving the at least one door wing relative to the furniture carcass.

13. The item of furniture according to claim 12, wherein the at least one door wing is movable by the guide system between a first position, in which the at least one door wing is aligned substantially parallel to the sidewall of the furniture carcass, and a second position, in which the at least one door wing is aligned substantially at a right angle to the sidewall of the furniture carcass.

14. The guide system according to claim 2, wherein the force storage member includes a helical spring.

15. The guide system according to claim 14, wherein the helical spring is a compression spring.

16. The guide system according to claim 3, wherein the transmission mechanism includes at least one pressure portion and at least one setting contour, and the at least one pressure portion can be displaceably supported on the at least one setting contour upon a relative movement of the first and second fitting portions to one another.

17. The guide system according to claim 16, wherein the at least one pressure portion:

is movable along a second guide; or is configured to be rotationally symmetrical; or is configured as a rotatable roller; or is arranged on a longitudinally extending pin.

18. The guide system according to claim 17, wherein the at least one pressure portion is movable along the second guide, and the second guide is an elongated hole.

19. The guide system according to claim 5, wherein the cover includes at least one recess for partially receiving at least one lever of the at least two levers.

20. The guide system according to claim 6, wherein the at least one fastening location of the second fitting portion includes at least one hole for fixing to the at least one door wing.

21. The guide system according to claim 7, wherein at least one lever connecting the first and second fitting portions to one another can be partially received between the at least two partial members of the at least one of the first and second fitting portions in at least one relative position.

22. The guide system according to claim 9, wherein the at least one furniture hinge comprises a plurality of furniture hinges, and all furniture hinges of the plurality of furniture hinges are arranged on the mounting member.

23. The guide system according to claim 9, wherein the mounting member is connected to the carrier in a direction extending transversely to a longitudinal direction of the carrier.

24. The arrangement according to claim 11, wherein the at least one door wing is configured to be driven relative to the carrier exclusively by the drive device, and the at least one furniture hinge does not have a force storage member for driving the at least one door wing.

25. A guide system for guiding at least one door wing relative to a furniture carcass, the guide system comprising:

a first guide configured to guide the at least one door wing along a sidewall of the furniture carcass; and a carrier movably supported along the first guide, the at least one door wing being supportable on the carrier over a pivoting path between a first position and a second position, wherein a drive device is arranged on the carrier or on a mounting member fixed to the carrier, and the at least one door wing is configured to be connected to the carrier in a mounted condition so as to be driven at least in a partial section of the pivoting path into the first position or into the second position by the drive device, wherein the drive device includes a first fitting portion fixed to the carrier or to the mounting member, and a second fitting portion configured to be fixed to the at least one door wing, wherein the first fitting portion and the second fitting portion are pivotally connected to each other, wherein the drive device includes a force storage member configured to drive the first fitting portion and the second fitting portion of the drive device relative to one another into the first position or into the second position, wherein the drive device includes a transmission mechanism for transmitting a force of the force storage member to the second fitting portion, the transmission mechanism including at least one pressure portion and at least one setting contour, and the at least one pressure portion can be displaceably supported on the at least one setting contour upon a relative movement of the first and second fitting portions to one another, and wherein the at least one pressure portion is movable along an elongated hole of a second guide, and wherein an entire circumference of the elongated hole is closed.

* * * * *